United States Patent
Rhoades et al.

(10) Patent No.: US 8,688,832 B2
(45) Date of Patent: *Apr. 1, 2014

(54) LOAD BALANCING FOR NETWORK SERVER

(75) Inventors: David B. Rhoades, Raleigh, NC (US); Tomasz F. Wilk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,232

(22) Filed: Sep. 10, 2012

(65) Prior Publication Data

US 2013/0007269 A1    Jan. 3, 2013

Related U.S. Application Data

(62) Division of application No. 11/381,147, filed on May 2, 2006, now Pat. No. 8,301,752.

(51) Int. Cl.
*G06F 15/173*    (2006.01)

(52) U.S. Cl.
USPC ............ 709/224; 709/225; 709/229; 370/230

(58) Field of Classification Search
USPC ....................................................... 709/224
See application file for complete search history.

(56) References Cited

U.S. PATENT DOCUMENTS

| | | | | |
|---|---|---|---|---|
| 5,949,784 | A * | 9/1999 | Sodder | 370/397 |
| 6,625,121 | B1 * | 9/2003 | Lau et al. | 370/230 |
| 7,139,271 | B1 * | 11/2006 | Parruck et al. | 370/392 |
| 7,554,914 | B1 * | 6/2009 | Li et al. | 370/235 |
| 7,580,409 | B1 * | 8/2009 | Swenson et al. | 370/392 |
| 7,639,674 | B2 * | 12/2009 | Yeh et al. | 370/359 |
| 2005/0080923 | A1 * | 4/2005 | Elzur | 709/238 |
| 2006/0146879 | A1 * | 7/2006 | Anthias et al. | 370/471 |
| 2007/0201466 | A1 * | 8/2007 | Kalkunte et al. | 370/389 |
| 2007/0248009 | A1 * | 10/2007 | Petersen | 370/230 |
| 2012/0057460 | A1 * | 3/2012 | Hussain et al. | 370/235 |
| 2012/0203875 | A1 * | 8/2012 | Dake et al. | 709/220 |
| 2012/0210416 | A1 * | 8/2012 | Mihelich et al. | 726/11 |

OTHER PUBLICATIONS

BladeCenter system overview Desai, D. M.; Bradicich, T. M.; Champion, D.; Holland, W. G.; Kreuz, B. M. IBM Journal of Research and Development vol. 49 , Issue: 6; Digital Object Identifier: 10.1147/rd. 496.0809 ; Publication Year: 2005 , pp. 809-821.*
Internet-Draft 'Internet Denial of Service Considerations' (draft-iab-dos-03.txt) (Sep. 15, 2005) to Handley et al. ("Handley").*
IBM Red Paper "IBM @server BladeCenter Layer 2-7 Network Switching" (Jan. 2004) to Hochstetler et al. ("Hochstetler").*

* cited by examiner

*Primary Examiner* — Phuoc Nguyen
*Assistant Examiner* — June Sison
(74) *Attorney, Agent, or Firm* — Steven M. Greenberg, Esq.; CRGO Law

(57) ABSTRACT

Embodiments of the invention address deficiencies of the art in respect to load balancing for servers having multiple blades and provide a novel and non-obvious method, system and computer program product for load balancing at the blade level for servers having multiple blades. In one embodiment of the present invention, a blade server for performing load balancing may comprise a plurality of blades, each blade coupled with a plurality of outgoing ports. The blade server may further include a blade management module configured for monitoring throughput performance of the server and the plurality of blades, wherein each blade is coupled with a plurality of outgoing ports, instructing a blade to switch from a first outgoing port to a second outgoing port when throughput performance decreases and instructing the blade to switch from the second outgoing port back to the first outgoing port when throughput performance increases.

12 Claims, 2 Drawing Sheets

LOAD BALANCING FOR NETWORK SERVER

This application is a Divisional of U.S. application Ser. No. 11/381,147, filed May 2, 2006, entitled "LOAD BALANCING FOR NETWORK SERVER," the entirety of which is incorporated herein by reference.

BACKGROUND OF THE INVENTION

1. Field of the Invention

The present invention relates to the field of network servers and more specifically to load balancing for network servers with multiple blades.

2. Description of the Related Art

A network server is computer or device on a network that manages network resources such as network traffic. A blade server comprises a server architecture that houses multiple server modules (i.e., blades) in a single chassis. Blade servers are widely used in datacenters to save space and improve system management. Either self-standing or rack mounted, the chassis in such an architecture provides the power supply, and each blade has its own Central Processing Unit (CPU), memory and hard disk. A blade is a single circuit board populated with components such as processors, memory, and network connections that are usually found on multiple boards. A blade is typically designed to slide into an existing server. Blades are more cost-efficient, smaller and consume less power than traditional box-based servers.

Blade servers generally provide their own management systems and may include a network or storage switch. With enterprise-class blade servers, disk storage is external, and the blades are diskless. This approach allows for more efficient failover because applications are not tied to specific hardware and a particular instance of the operating system. The blades are anonymous and interchangeable.

An increasing problem for networks that are connected to the Internet is a Denial of Service (DoS) attack. A DoS attack is an assault on a network that floods it with so many additional requests that regular traffic is either slowed or completely interrupted. A DoS attack interrupts network service for some period, resulting in a condition in which the victim system can no longer respond to normal requests. Various approaches have arisen to defend against such attacks.

One approach to fending off DoS attacks is the capability of some blade servers to shield individual blades from the DoS attack by shifting workload to other resources. A multihomed blade server can monitor TCP/IP (Transmission Control Protocol/Internet Protocol) traffic and throughput and perform load balancing functions. Multihomed is used to describe a host connected to two or more networks or having two or more network addresses. For example, a network server may be connected to a serial line and a Local Area Network (LAN) or to multiple LANs. In this approach, at the server level, workload is sent to uplinks with lesser loads. The problem with this approach is that a blade may be unaware of the fact that an external uplink is loaded and will continue forwarding workload to that uplink. That is, load balancing does not occur at the blade level.

Thus, the need arises to solve the problems with the prior art above and specifically for a more efficient way to perform load balancing in a server with multiple blades.

BRIEF SUMMARY OF THE INVENTION

Embodiments of the invention address deficiencies of the art in respect to load balancing for servers having multiple blades and provide a novel and non-obvious method, system and computer program product for load balancing at the blade level for servers having multiple blades. In one embodiment of the present invention, a blade server for performing load balancing may comprise a plurality of blades, each blade coupled with a plurality of outgoing ports. The blade server may further includes a blade management module configured for monitoring throughput performance of the server and the plurality of blades, instructing a blade to switch from a first outgoing port to a second outgoing port when throughput performance decreases and instructing the blade to switch from the second outgoing port back to the first outgoing port when throughput performance increases.

The blade server may comprise a network interface adapter within each of the plurality of blades for coupling with a plurality of outgoing ports. The blade server may further comprise an inter-integrated circuit communication bus for allowing the blade management module to perform the monitoring step and the first and second instructing steps and a first bit within each of the plurality of blades, wherein the first bit is set when instructed by the blade management module to switch from the first outgoing port to the second outgoing port and vice versa.

In another embodiment of the present invention, a method for load balancing on a server having a plurality of blades can include monitoring throughput performance of the server and the plurality of blades, wherein each blade is coupled with a plurality of outgoing ports. The method may further include instructing a blade to switch from a first outgoing port to a second outgoing port when throughput performance decreases. The method may further include instructing the blade to switch from the second outgoing port back to the first outgoing port when throughput performance increases.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide a method, system and computer program product for load balancing at the blade level for servers with multiple blades. In accordance with an embodiment of the present invention, a blade server for performing load balancing, such as the IBM BladeCenter available from International Business Machines of Armonk, N.Y., may comprise a plurality of blades, each blade coupled with a plurality of outgoing ports via a network interface adapter, for example. The blade server may further include a blade management module configured for monitoring throughput performance of the server and the plurality of blades. The management module may be coupled with each of the plurality of blades via an inter-integrated circuit communication bus. The management module may instruct a blade to switch from a first outgoing port to a second outgoing port, when throughput performance decreases due to, for example, a DoS attack. The management module may further instruct the blade to switch from the second outgoing port back to the first outgoing port, when throughput performance increases.

Figure 1:
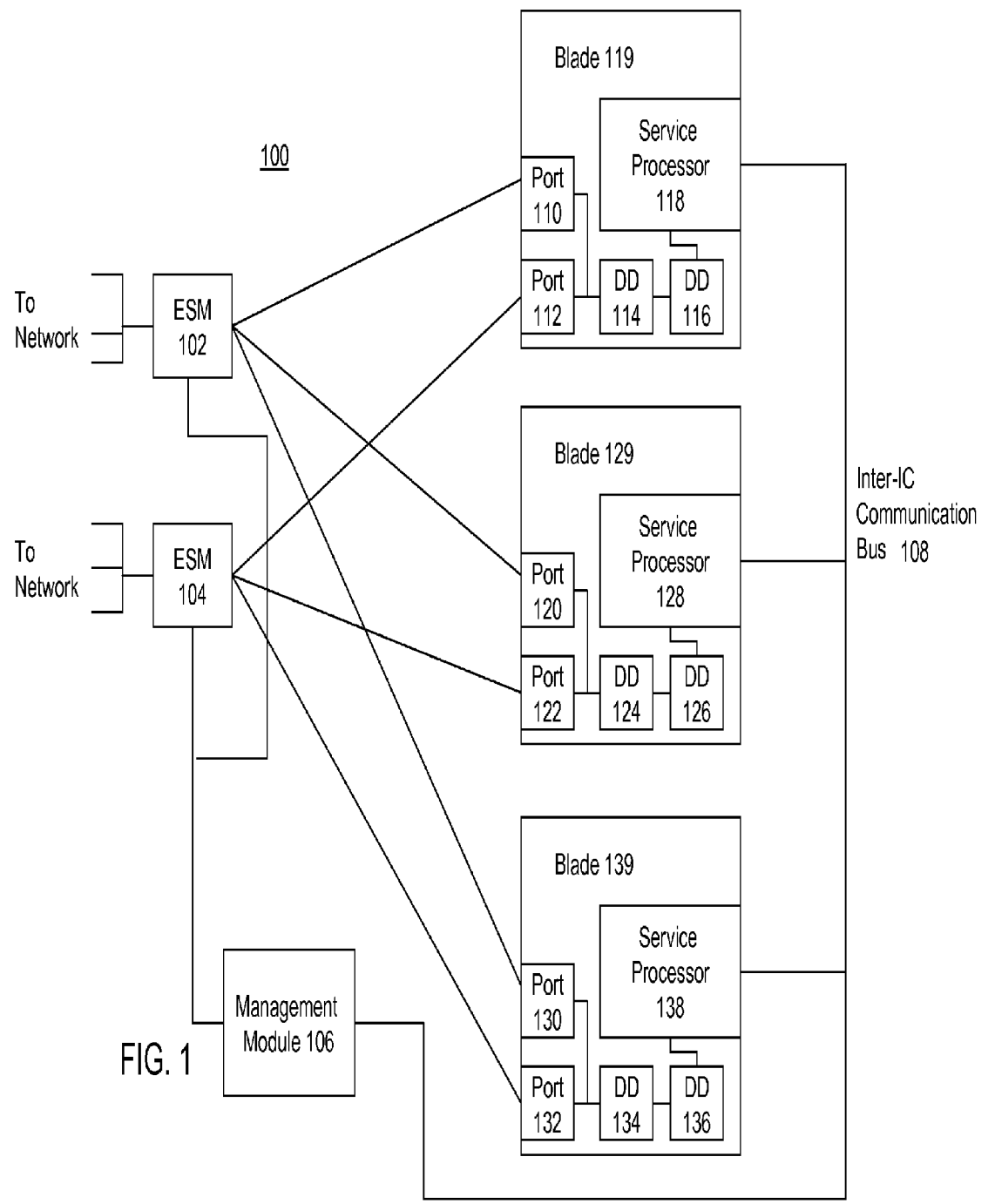
FIG. 1 is a schematic illustration of a blade server for performing load balancing at the blade level, according to one embodiment of the present invention; and, FIG. 2 is a flow chart illustrating a process for supporting load balancing at the blade level, according to one embodiment of the present invention.

FIG. 1 is a schematic illustration of a blade server 100 for performing load balancing at the blade level, according to one embodiment of the present invention. FIG. 1 shows a blade server 100 including three separate blades 119, 129 and 139. The blade server 100 comprises a server architecture that can house multiple server modules or blades 119, 129 and 139 in a single chassis. Each blade functions semi-independently and has its own CPU, memory and hard disk (not shown).

Blade 119 comprises a service processor 118, such as a silicon chip, that controls the logic and substantially performs the necessary functions of the blade 119. The service processor 118 is controlled by the service processor device driver 116, which contains a program for managing the service processor 118. The device driver 116 acts like a translator between the service processor 118 and programs or hardware components that use the service processor 118. The device driver 116 accepts generic commands from a program or hardware component and then translates them into specialized commands for the service processor 118. Blade 119 further comprises outgoing ports 110 and 112. In one embodiment of the present invention, outgoing ports 110 and 112 are outgoing ports to a network such as an Ethernet network interface adapter. Outgoing ports 110 and 112 are controlled by the device driver 114, which contains a program for managing the outgoing ports 110 and 112.

FIG. 1 also shows that blade server 100 includes two Ethernet Switching Modules (ESMs) 102, 104. An ESM provides high-speed intelligent switching between an outside network and the blades 119, 129 and 139. An ESM acts like a gateway to the outside world for the blades 119, 129 and 139. FIG. 1 shows that each ESM is connected to each of the blades 119, 129 and 139. Further, each ESM is connected to the management module 106.

It should be noted that although FIG. 1 shows only three blades 119, 129 and 139, the system 100 of the present invention supports any viable number of blades. Further, although FIG. 1 shows only two outgoing ports (110, 112, 120, 122, 130, 132) for each blade and two ESMs for the blade server 100, the system of the present invention supports any viable number of outgoing ports for each blade and ESMs for the blade server 100.

FIG. 1 also shows management module 106 which communicates with each of the blades 119, 129 and 139 within the blade server 100 via an inter-integrated circuit communications bus 108. The management module 106 can monitor the status of and control all blades 119, 129 and 139 within the blade server 100. The management module 106 can shut down and restart any blade and perform other manageability functions. The management module 106 can also monitor performance of the blade server 100 at the blade level and at the server level. In the present invention, the management module 106 also performs blade-level load balancing as described below.

Figure 2:
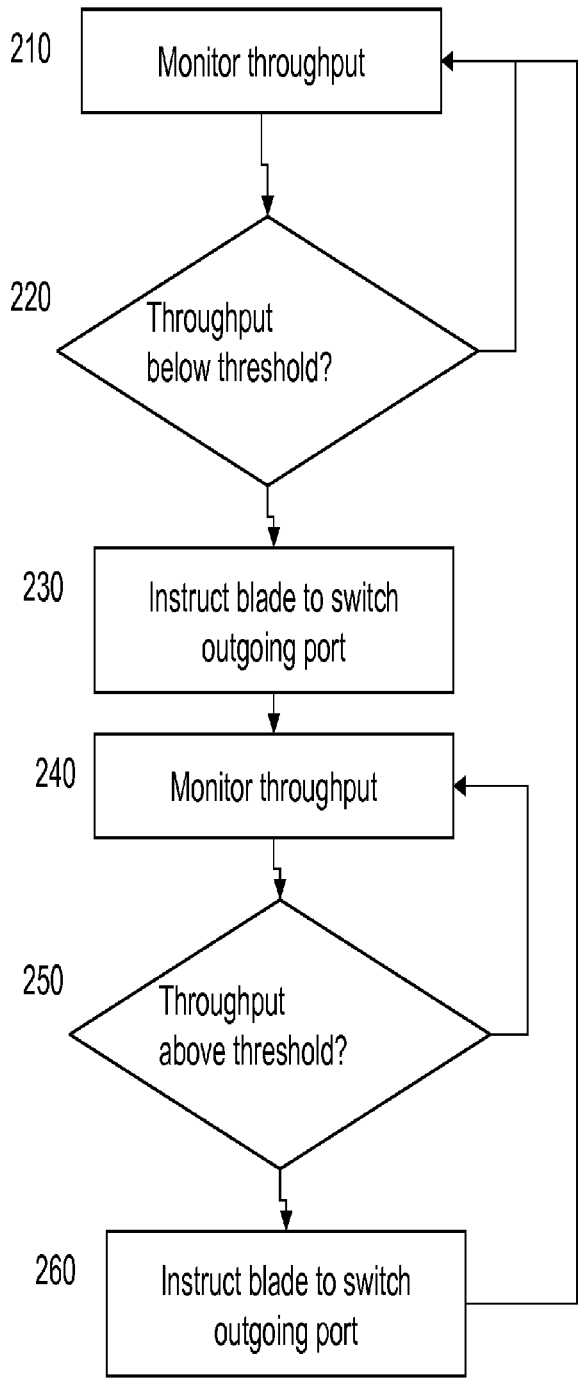

FIG. 2 is a flow chart illustrating a process for supporting load balancing at the blade level, according to one embodiment of the present invention. Notably, the process can be performed within blade server 100 for load balancing at the blade-level. Beginning in block 210, the management module 106 monitors the throughput of all blades 119, 129 and 139 within the blade server 100. Namely, the management module 106 1) monitors the throughput of the blade server 100 by monitoring the overall I/O performance of the blade server 100 and 2) monitors the throughput of the blades 119, 129 and 139 by monitoring the overall I/O performance of the blades at ESMs 102, 104. In one embodiment of the present invention, the management module 106 monitors throughput performance by measuring the number of TCP/IP packets entering and exiting a point or node.

In block 220, it is determined whether the throughput performance measured in block 210 has dropped below a predetermined threshold. If the result of the determination of block 220 is positive, control flows to step 230. If the result of the determination of block 220 is negative, control flows back to step 210. Throughput performance measured in block 210 may drop below a predetermined threshold for a variety of reasons, such as a DoS attack being waged against the blade server 100 or a mechanical malfunction of a blade.

In block 230, the management module 106 instructs a blade, such as blade 119, to switch from a first outgoing port 110 to a second outgoing port 112 when throughput performance decreases. In one embodiment of the present invention, the instruction of block 230 occurs by the management module 106 sending an instruction via inter-integrated circuit communication bus 108 to device driver 116 to set a particular bit on service processor 118. This bit, when set, indicates to the device driver 114 to switch from a first outgoing port 110 to a second outgoing port 112. In block 240, the management module 106 continues to monitor the throughput performance of the server 100 and the blades 119, 129 and 139.

In block 250, it is determined whether the throughput performance measured in block 240 has increased above a predetermined threshold. If the result of the determination of block 250 is positive, control flows to step 260. If the result of the determination of block 250 is negative, control flows back to step 240.

In block 260, the management module 106 instructs blade 119 to switch from the second outgoing port 112 to the first outgoing port 110 when throughput performance increases. In one embodiment of the present invention, the instruction of block 260 occurs by the management module 106 sending an instruction via inter-integrated circuit communication bus 108 to device driver 116 to re-set a particular bit on service processor 118. This bit, when re-set, indicates to the device driver 114 to switch from the second outgoing port 112 to the first outgoing port 110. In block 210, the management module 106 continues to monitor the throughput performance of the server 100 and the blades 119, 129 and 139.

The embodiments of the invention can take the form of an entirely hardware embodiment, an entirely software embodiment or an embodiment containing both hardware and software elements. In one embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A blade server for performing load balancing, comprising:
    a plurality of server modules, each server module having a service processor and a plurality of outgoing ports, each outgoing port being connected to an Ethernet switch module;
    a blade management module configured for:
    monitoring throughput performance of the server and the plurality of server modules;
    instructing a server module to switch from a first outgoing port to a second outgoing port, when throughput performance of the server module decreases; and
    instructing the server module to switch from the second outgoing port back to the first outgoing port, when throughput performance of the server module increases.

2. The blade server of claim 1, further comprising:
    a network interface adapter within each of the plurality of server modules for coupling with a plurality of outgoing ports.

3. The blade server of claim 2, further comprising:
    an inter-integrated circuit bus for allowing the blade management module to perform the monitoring step and the first and second instructing steps.

4. The blade server of claim 3, wherein
    each Ethernet switch module coupled with the blade management module for monitoring throughput performance of the plurality of server modules.

5. The blade server of claim 4, further comprising:
    a first bit within each of the plurality of server modules, wherein the first bit is set when instructed by the blade management module to switch from the first outgoing port to the second outgoing port and vice versa.

6. The blade server of claim 1, wherein each of the plurality of server modules is coupled with two outgoing ports.

7. A computer program product comprising a computer usable storage medium, wherein the medium includes elements implemented in hardware, embodying computer usable program code for load balancing on a server having a plurality of server modules, the computer program product comprising:
    computer usable program code for monitoring throughput performance of the server and the plurality of server modules, wherein each server module is coupled with a plurality of outgoing ports, each outgoing port being connected to an Ethernet switch module;
    computer usable program code for instructing a server module to switch from a first outgoing port to a second outgoing port, when throughput performance of the server module decreases; and
    computer usable program code for instructing the server module to switch from the second outgoing port back to the first outgoing port, when throughput performance of the server module increases.

8. The computer program product of claim 7, wherein the computer usable program code for monitoring comprises:
    computer usable program code for monitoring throughput performance of the server and the plurality of server modules based on number of TCP/IP packets, wherein each server module is coupled with two outgoing ports.

9. The computer program product of claim 8, wherein the first computer usable program code for instructing comprises:
    computer usable program code for instructing a server module to switch from a first outgoing port to a second outgoing port, when throughput performance decreases due to a Denial of Service (DoS) attack on the server.

10. The computer program product of claim 9, wherein the first computer usable program code for instructing comprises:
    computer usable program code for instructing a server module to switch from a first outgoing port to a second outgoing port by setting a bit on the server module, when throughput performance decreases due to a Denial of Service (DoS) attack on the server.

11. The computer program product of claim 9, wherein the second computer usable program code for instructing comprises:
    computer usable program code for instructing the server module to switch from the second outgoing port back to the first outgoing port, when throughput performance based on number of TCP/IP packets increases.

12. The computer program product of claim 11, wherein the second computer usable program code for instructing comprises:
    computer usable program code for instructing the server module to switch from the second outgoing port back to the first outgoing port by setting a bit on the server module, when throughput performance based on number of TCP/IP packets increases.

* * * * *